United States Patent
Bansal et al.

(10) Patent No.: US 10,495,816 B2
(45) Date of Patent: Dec. 3, 2019

(54) CLADDING MODE STRIPPER FOR USE WITH OPTICAL SYSTEMS AND METHODS OF FORMING THE SAME

(71) Applicant: OFS Fitel, LLC, Norcross, GA (US)

(72) Inventors: Lalitkumar Bansal, Belle Mead, NJ (US); Clifford E Headley, Flemington, NJ (US); Andrea Rosales-Garcia, New York, NY (US); Jerome C Porque, Lebannon, NJ (US)

(73) Assignee: OFS FITEL, LLC, Norcross, GA (US)

( * ) Notice: Subject to any disclaimer, the term of this patent is extended or adjusted under 35 U.S.C. 154(b) by 236 days.

(21) Appl. No.: 15/460,304

(22) Filed: Mar. 16, 2017

(65) Prior Publication Data

US 2018/0267233 A1    Sep. 20, 2018

(51) Int. Cl.
| | |
|---|---|
| *G02B 6/14* | (2006.01) |
| *G02B 6/02* | (2006.01) |
| *H01S 3/067* | (2006.01) |
| *H01S 3/094* | (2006.01) |
| *C03C 25/106* | (2018.01) |
| *G02B 6/036* | (2006.01) |

(52) U.S. Cl.
CPC ............ *G02B 6/14* (2013.01); *C03C 25/1061* (2018.01); *G02B 6/02052* (2013.01); *G02B 6/03694* (2013.01); *H01S 3/06708* (2013.01); *H01S 3/06754* (2013.01); *H01S 3/094003* (2013.01)

(58) Field of Classification Search
None
See application file for complete search history.

(56) References Cited

U.S. PATENT DOCUMENTS

| | | | |
|---|---|---|---|
| 6,304,705 B1 | 10/2001 | Kalish et al. | |
| 6,999,481 B1 | 2/2006 | Jurgensen | |
| 8,433,161 B2 | 4/2013 | Langseth et al. | |
| 8,724,863 B2 | 5/2014 | Kumkar et al. | |
| 9,091,800 B2 | 7/2015 | Holland et al. | |
| 9,213,135 B2 | 12/2015 | Ilyashenko et al. | |
| 9,897,759 B2 * | 2/2018 | Botheroyd | G02B 6/2856 |
| 2002/0025132 A1 | 2/2002 | Zarian et al. | |
| 2013/0016742 A1 | 1/2013 | Sakamoto | |
| 2014/0362877 A1 * | 12/2014 | Gapontsev | H01S 3/06708 372/6 |
| 2015/0362684 A1 * | 12/2015 | Seo | G02B 6/4296 385/31 |

OTHER PUBLICATIONS

Wetter, Alexandre, et al., "High Power Cladding Light Strippers", Proc. of SPIE vol. 6873, (2008), pp. 687327-1 to 687327-8.
Babazadeh, Amin, et al., "Robust cladding light stripper for high-power fiber lasers using soft metals", Applied Optics, Apr. 20, 2014/vol. 53, No. 12, pp. 2611-2615.
Wang, Wenliang, et al., "Method for stripping cladding light in the High power fiber laser", Optics Communication 287 (2013) 187-191.

* cited by examiner

*Primary Examiner* — Michelle R Connelly
(74) *Attorney, Agent, or Firm* — Wendy W. Kobn, Esq.

(57) ABSTRACT

An all-glass cladding mode stripper comprises a plurality of high refractive index, small diameter glass beads disposed along an exposed portion of the inner cladding region of an optical fiber. The unwanted low NA signal light (as well as any other type of stray light) propagating within the cladding layer is removed by refracting into the adjacent beads, where this captured light then scatters away from the optical fiber.

3 Claims, 4 Drawing Sheets

US 10,495,816 B2

CLADDING MODE STRIPPER FOR USE WITH OPTICAL SYSTEMS AND METHODS OF FORMING THE SAME

TECHNICAL FIELD

The present invention relates to optical systems and, more particularly, to a cladding mode stripper useful in removing unwanted low numerical aperture (NA) light propagating within a cladding layer of an optical fiber.

BACKGROUND OF THE INVENTION

There are a variety of circumstances where stray light is found to be propagating within a cladding layer of an optical fiber. For example, a fusion splice between fibers of dissimilar core diameter (or mis-aligned core regions) may result in coupling a portion of a propagating optical signal into the nearby cladding layer. This unwanted coupling at a fusion splice is even more likely to occur when splicing a fiber bundle (or a tapered fiber bundle) to an output fiber. In any case, when this stray light is associated with a relatively high power level (for example, greater than 1 W or so), the light will begin to heat the fiber, resulting in thermal damage (and eventually system failure).

In particular, fiber-based lasers and optical amplifiers exemplify high power optical systems that are susceptible to this type of thermal damage. These high power, fiber-based components typically utilize a cladding layer of the fiber structure to introduce the requisite pump light to a section of rare earth-doped gain fiber. The gain fiber comprises a core region surrounded by at least two separate cladding layers, with the pump light introduced into the cladding layer adjacent to the core region.

At the far-end termination of the gain fiber, some residual pump light, as well as other unwanted spurious signals (for example, low NA signal light) may still be propagating along the cladding layer (referred to hereinafter at times as "cladding modes"). One existing method of removing the low NA signal light utilizes a long length of high index, re-coated double clad fiber. However, this high index coating is itself prone to thermal damage.

Thus, alternative non-coating based methods of stripping out low NA light (e.g., NA<0.15) are of interest.

TECHNICAL FIELD

The need remaining in the prior art is addressed by the present invention, which relates to high power optical systems and, more particularly, to a cladding mode stripper useful in removing unwanted low numerical aperture (NA) light propagating within a cladding layer of an optical fiber.

In accordance with exemplary embodiments of the present invention, an all-glass cladding mode stripper comprises a plurality of high refractive index, small diameter glass beads disposed along an exposed portion of an inner cladding layer of an optical fiber. The unwanted low NA signal light (as well as any other type of stray light) propagating within the cladding layer is removed by refracting into the adjacent beads, where this captured light then scatters away from the optical fiber.

In a preferred embodiment of the present invention, the glass beads exhibit a refractive index in the range of about 1.44 to 1.9 (i.e., at least greater than the refractive index of the cladding layer) and a diameter generally on the same order as the wavelength of the propagating light (typically, greater than about 1.0 µm). There is a trade-off between the (average) diameter of the glass beads and the thermal efficiency of the configuration (i.e., a measure of increase in fiber temperature as a function of signal power), and the beads preferably maintain a diameter no greater than about 60 µm. In fabrication, the beads may be directly fused to the cladding layer within which the low NA signal light is propagating. Alternatively, the beads may be suspended within a low index material that is disposed to coat a portion of the cladding layer.

It is an aspect of the present invention that the bead-based cladding mode stripper may be used with any type of optical fiber and in any situation where stray light (particularly low NA light that requires a relatively long interaction length to be refracted) needs to be stripped away.

One particular embodiment of the present invention takes the form of an optical device for removing stray light propagating along a cladding layer of an optical fiber, the device comprising a plurality of glass beads disposed around an exposed portion of the cladding layer of the optical fiber, the beads having a diameter greater than the wavelength of the stray light and a refractive index value greater than the refractive index value of the cladding layer, the stray light refracting out of the cladding layer and into the plurality of glass beads, scattering away from the optical fiber.

Another embodiment relates to an optical system comprising an optical fiber comprising a doped core region for amplifying a propagating optical signal and a cladding layer for supporting the propagating of pump light utilized to amplify the propagating optical signal, and an outer coating layer disposed to surround the cladding layer, wherein a portion of the propagating optical signal enters the cladding layer and becomes unwanted stray light, and an all-glass cladding mode stripper disposed along an exposed section of the cladding layer where the outer coating layer has been removed, the all-glass cladding mode stripper for refracting stray light away from the optical system and comprising a plurality of glass beads disposed to surround the exposed section of the cladding layer, the glass beads having a diameter greater than the wavelength of the propagating optical signal and a refractive index value greater than the refractive index value of the cladding layer, the stray optical signal refracting out of the cladding layer and into the plurality of glass beads, scattering away from the optical fiber.

Yet another exemplary embodiment of the present invention relates to a method of fabricating an all-glass cladding mode stripper for an optical fiber including the steps of: providing an optical fiber having a core region surrounded by a cladding layer, with one or more outer layers disposed to surround the cladding layer; exposing a section of the cladding layer, the length of the exposed section defining an interaction length of the cladding mode stripper; and disposing a plurality of glass beads around the exposed section of the cladding layer, the plurality of glass beads formed of a material having a refractive index greater than the refractive index of the cladding layer, with each bead having a diameter less than about 100 µm.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As discussed above, a cladding mode stripper formed in accordance with an exemplary embodiment of the present invention is specifically configured to remove the unwanted, low numerical aperture (NA) signal light that is propagating within the cladding layer of an optical fiber (at the output of, for example, a fiber-based optical amplifier or fiber-based optical laser; or, alternatively at a splice location between fibers, a beam combiner, etc.). Low NA light cannot easily be removed using conventional, well-known prior art cladding mode stripping techniques, since it does not sufficiently interact with the cladding (and other outer layers) over the relatively short length of optical fiber used to implement pump light cladding mode strippers. That is, the utilization of a relatively long interaction length (as required to remove low NA light) is not a practical solution (size too large for most applications, expenses associated with long lengths of fiber, etc.), while constraining the length of fiber to maintain cost and size requirements results in thermal management problems (too much heat to dissipate over the short fiber length).

Advantageously, the use of separate, small diameter glass beads instead of a continuous capillary tube (the tube being a preferred prior art mode stripper) provides a degree of robustness that allows for a relatively long (e.g., greater than 20 mm) mode stripper to be used without fear of structural damage to the mode stripper itself.

Figure 1:
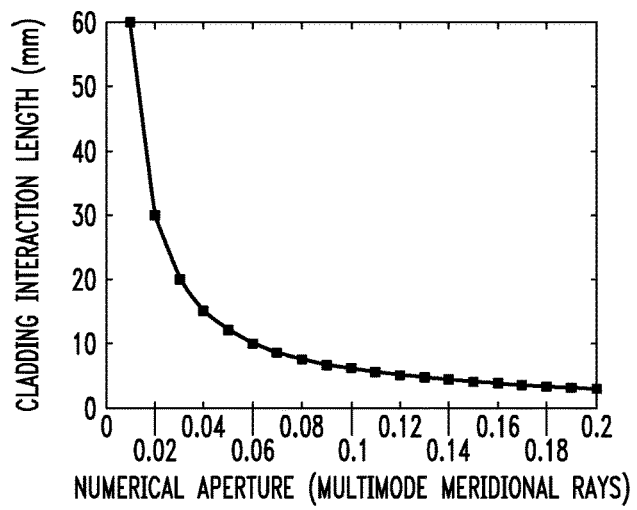
FIG. 1 is a graph illustrating the relationship between NA and interaction length.

FIG. 1 is a graph illustrating the relationship between NA and interaction length, showing the exponential nature of the relationship between these parameters (the values generated for a standard 400 µm cladding diameter fiber supporting the propagation of multimode meridional rays). Referring to FIG. 1, as the NA decreases, the interaction length required for out-coupling the light increases exponentially. For a typical "low NA" of 0.02, it is shown that an interaction length of at least 30 mm is required. This length is well beyond the capabilities of prior art glass tube (capillary) mode stripping structures, which are fragile and tend to break for lengths greater than about 10 mm.

Figure 2:
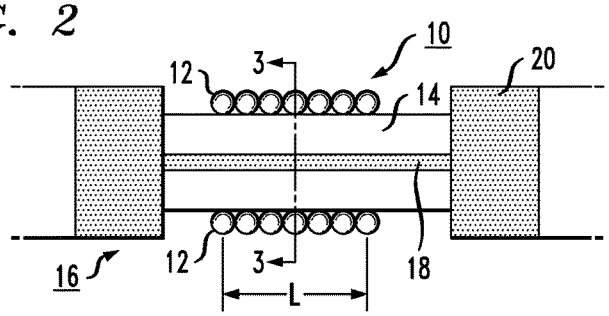
FIG. 2 is a cut-away side view of an exemplary all-glass cladding mode stripper formed in accordance with an exemplary embodiment of the present invention.

FIG. 2 illustrates an exemplary all-glass, high power cladding mode stripper 10 formed in accordance with one exemplary embodiment of the present invention to address and overcome these and other problems remaining in the prior art. As shown, cladding mode stripper 10 comprises a plurality of glass beads 12 that is coupled to a cladding layer 14 of an optical fiber 16. Optical fiber 16 also includes a core region 18 and an outer polymer coating 20. Glass beads 12 are formed of a material that has a refractive index greater than that of cladding layer 14, thus providing a path for the stray light to be refracted. As mentioned above, glass beads 12 are formed to exhibit a relatively small diameter (which does not need to be uniform), but of a diameter greater than the wavelength of the light propagating through the fiber (typically, diameters on the order of 1-100 µm are suitable). Moreover, it is to be understood that the beads need not be perfectly spherical in form and beads that are somewhat elongated or otherwise deformed are possible alternatives.

Stray light propagating within cladding layer 14 is known to be problematic, as discussed above. A portion of this stray light may comprise residual pump light (in the case of lasers or amplifiers) that is relatively easy to remove using conventional methods. Low numerical aperture (NA) signal light may also appear within the cladding (i.e., a "cladding mode"), and is depicted in the arrangement of FIG. 2. Inasmuch as this low NA light does not remain within the cladding for relatively long periods of time, it is difficult to remove within a suitable interaction length, as discussed above. The low NA cladding mode stray light may be signal light propagating outside the core region boundaries within a fiber amplifier or laser. Alternatively, the low NA stray light may arise in splice locations between fibers. An all-glass cladding mode stripper 10, as described in detail below, is effective and efficient in removing this low NA light from cladding layer 14.

Continuing with a description of all-glass cladding mode stripper 10, beads 12 comprise a glass material having a relatively high index of refraction (with respect to the refractive index of cladding layer 14), so that stray light within cladding layer 14 will refract out of cladding layer 14 and scatter in directions away from fiber 16. In particular, a refractive index in the range of 1.44 to 1.9 is suitable for the beads utilized as the inventive cladding mode stripper.

Figure 3:
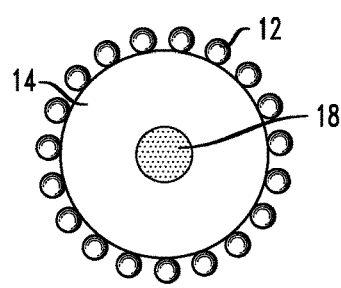
FIG. 3 is a cut-away end view of the cladding mode stripper of FIG. 2, illustrating the disposition of a plurality of glass beads to surround an exposed cladding layer.

As shown in FIG. 2, the plurality of beads 12 is disposed along a section of optical fiber 16 where inner cladding layer 14 has been exposed. In the particular embodiment shown in FIG. 2, beads 12 are disposed along a length L of this exposed section. The value of "L" is determined in accordance with the interaction length required for the removal of a sufficient amount of the stray cladding mode light. FIG. 3 is a cut-away end view of cladding mode stripper 10 taken along line 3-3 of FIG. 2, illustrating the disposition of beads 12 around the periphery of cladding layer 14.

Figure 4:
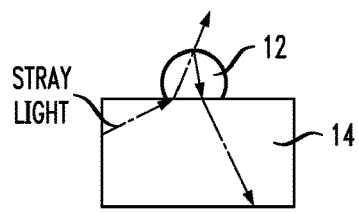
FIG. 4 is an enlarged view of a portion of FIG. 2, illustrating an attachment of a glass bead to the optical fiber cladding layer, as well as the path traveled by stray light as it is refracted by the glass bead.

As the low NA stray light that is propagating within cladding layer 14 encounters beads 12, the light refracts out of cladding layer 14. In particular, the physical design of beads 12 functions to scatter this out-coupled light away from optical fiber 16, reducing the possibilities for thermal damage (as may otherwise occur if the low NA is permitted to remain propagating within optical fiber 16). FIG. 4 is an enlarged view of a portion of cladding layer 14 and a single bead 12, showing the refraction and scattering actions provided by cladding mode stripper 10 formed in accordance with an exemplary embodiment of the present invention.

As mentioned above, the scattering beads need to have a relatively high refractive index (e.g., in the range of about 1.44 to about 1.9). Materials that may be used to form the mode-stripping beads include, but are not limited to, $SiO_2$, glass, sapphire, soda lime, aluminum oxide, or the like. Preferably, the selected material has a coefficient of thermal expansion that substantially matches that of the optical fiber itself so as to minimize structural damage to the cladding mode stripper during ambient temperature fluctuations. It is also preferred that a diameter D of the beads is greater than the wavelength of the light required to be scattered (typically, a diameter greater than one micron). As will be discussed in detail below, beads having a diameter in the range of about 1-50 μm have been found suitable for use as a cladding mode stripper.

Figure 5:
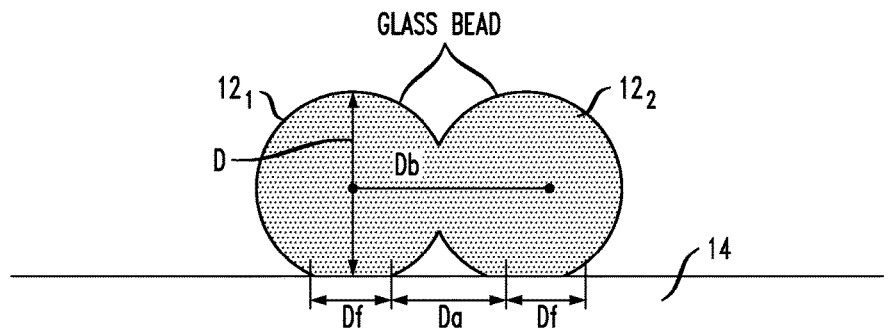
FIG. 5 is a diagram showing a pair of glass beads positioned on a portion of the cladding layer, including definitions of various parameters related to the beads and their relative dimensions.
Figure 5:
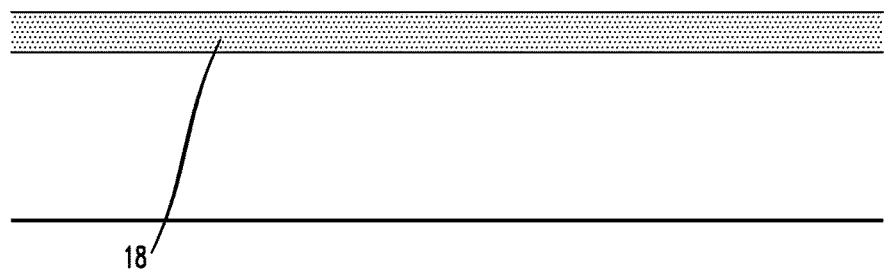

FIG. 5 illustrates a portion of an exemplary cladding mode stripper 10, illustrating the various properties associated with the physical size of beads 12. A pair of beads $12_1$ and $12_2$ is shown in this view, with the beads being directly fused to surface 14-S of cladding layer 14. A heat source such as an $H_2/O_2$ torch may be used to fuse beads 12 to cladding layer 14. Regardless of the method used to attach the beads to the cladding layer, the inclusion of the beads creates a pathway for the stray light present in cladding layer 14 to scatter away from optical fiber 16. Also illustrated in FIG. 5 is the distance between the center of bead $12_1$ and the center of bead $12_2$ (shown as $D_b$), the length of the fusion attachment of each bead to cladding layer 14 (shown as $D_f$), and the length of the "gap" between adjacent beads at the surface of cladding layer 14, defined as the fiber-air interface length and shown as $D_a$.

For efficient operation of the inventive cladding mode stripper, the pathways should fill a large fraction of the total fiber surface. Thus, the following relation is applicable:

$$D_a \approx D_b - D_f.$$

To increase the interaction between the fiber and the beads, it can be seen that $D_a$ should be minimized. This can be achieved by decreasing the diameter of the bead itself or increasing the length of the fusion connection between the bead and the fiber surface. Decreasing the diameter of the beads may allow for a more stable and uniform coverage of the beads on the surface of the fiber. Additionally, it has been found that the fusion length is associated with the possibility of creating point stress concentrators at the microscopic joint between the bead and the fiber surface. While such stress concentrations may affect the mechanical strength of the fiber, a suitable strength may be maintained by managing the degree of fusion (which is related, in turn, to the diameter of the beads). To further minimize stresses between the beads and the fiber, it is also desirable to utilize beads which exhibit a CTE similar to that of the fiber.

Figure 6:
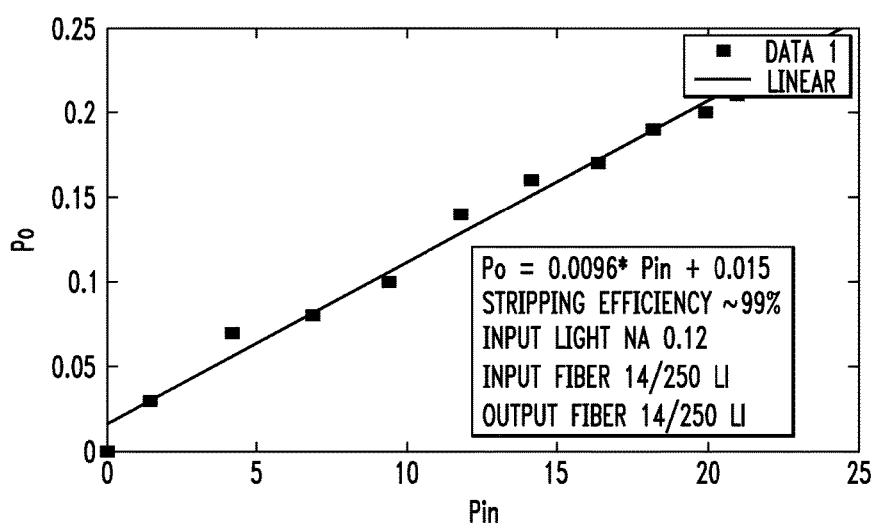
FIG. 6 is graph of stripping efficiency for an exemplary all-glass cladding mode stripper formed in accordance with an exemplary embodiment of the present invention.

FIG. 6 is a graph of the light stripping efficiency of all-glass cladding mode stripper 10 of an exemplary embodiment of the present invention, plotting the remaining output power of the stray light as a function of initial input power (measured in W). For this particular embodiment, beads 12 comprised soda lime glass beads having a diameter in 1-10 μm range (soda lime glass having a refractive index of about 1.52). An exemplary fiber was tested wherein glass beads 12 were fused to cladding layer 14 using an $H_2/O_2$ torch. The light stripping efficiency was measured by injecting 0.12 NA pump light (operating at 980 nm) into cladding layer 14. Referring to the plot of FIG. 6, a light stripping efficiency on the order of 96% was achieved (that is, 96% of the stray light was removed by the inventive cladding mode stripper).

A variety of different methods may be used to dispose the plurality of beads in a coupling relationship to the cladding layer. As mentioned above, the beads may be directly fused to the outer surface of the cladding layer. This technique is appropriate in situations where the beads have a low melting point and can be attached to the fiber without affecting the properties of the fiber itself. Besides the $H_2/O_2$ torch mentioned above, other direct heat sources that may be used to perform this fusion process include (but are not limited to), the use of a $CO_2$ laser, RF heating, or a resistive filament heating arrangement. A material may be selected for the composition of the beads such that the melting point of the beads is less than that of the material forming the fiber itself (soda lime is exemplary of a material with a relatively low melting point). In this case, the fusion process allows for the beads to be adhered to the cladding layer without distorting (melting) any portion of the fiber itself. As such, the integrity of the signal light propagating through the core region of the fiber is preserved, even in the case of large mode area (LMA) fibers that are ordinarily sensitive to physical perturbations of the fiber structure.

Figure 7:
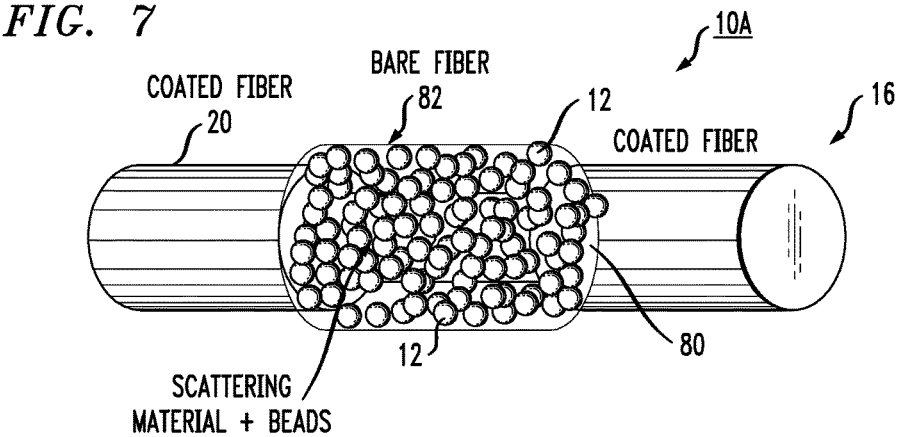
FIG. 7 illustrates an alternative embodiment of the present invention, in this case where the plurality of glass beads is combined with a polymer adhesive and attached to the exposed cladding layer.

Alternatively, an index-matching liquid may be used to bond the beads to the exposed cladding layer. Materials such as spin-on glass or an appropriate polymer adhesive may be used. FIG. 7 illustrates an exemplary all-glass cladding mode stripper 10A formed in accordance with an exemplary embodiment of the present invention where the plurality of glass beads 12 is first immersed in a liquid 70 (the combination forming a "scattering medium 72"), with scattering medium 72 then applied to coat a portion of optical fiber 16 where cladding layer 14 has been exposed (cladding layer 14 not visible in this illustration). In particular, the prepared fiber (that is, a fiber having a portion of the cladding layer exposed) may be immersed in scattering medium 72, where medium 72 will preferably adhere to cladding layer 14 and leave outer polymer coating 20 uncovered. Liquid 70 may be a polymer, gel, or any appropriate compound with which beads 12 may be mixed to form a suspension. In accordance with an exemplary embodiment of the present invention, the concentration of beads 12 in liquid 70 is controlled such that the contact of beads 12 along exposed cladding layer 14 provides a sufficient interaction length for the low NA stray light.

Figure 8:
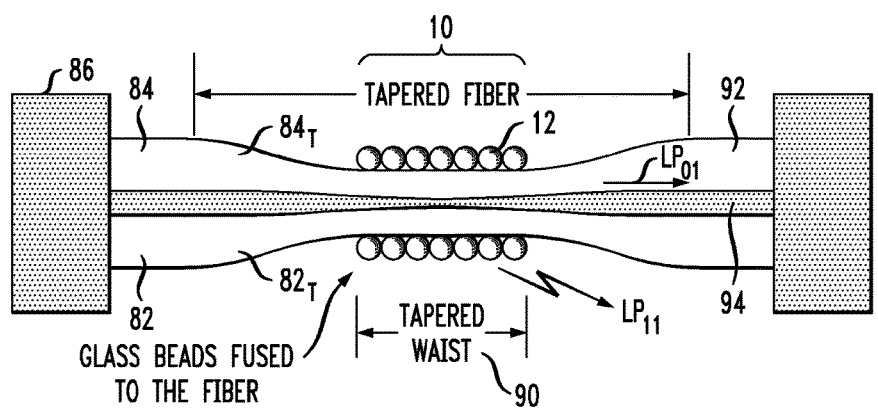
FIG. 8 depicts the utilization of the cladding mode stripper of an exemplary embodiment of the present invention to remove unwanted higher-order modes (HOMs) along a tapered section of optical fiber.

As mentioned above, the all-glass cladding mode stripper of the various embodiments of the present invention may be used in a variety of different applications where there is a desire to remove stray light from the cladding layer of an optical fiber. FIG. 8 illustrates one exemplary application where all-glass cladding mode stripper 10 is used to remove higher-order modes (HOMs) that have been propagating along a section of HOM fiber. As shown, an HOM fiber 80 includes a core region 82 that is capable of supporting the propagation of multiple optical modes (for example, both the fundamental $LP_{01}$ mode and the higher-order $LP_{11}$ mode). HOM fiber 80 also includes cladding layer 84 and an outer coating layer 86.

One known configuration for eliminating HOMs from continuing to propagate along a section of HOM fiber is to create a taper structure, such as tapered region 88 shown in FIG. 8. In particular, tapered region 88 is particularly designed to continue to support the propagation of the fundamental mode within (tapered) core region $82_T$, but causes the higher order modes to essentially reside in the (tapered) cladding layer $84_T$. Beyond tapered region 88 is a taper waist 90, defined as exhibiting the minimal physical size of both tapered core region $82_T$ and tapered cladding layer $84_T$.

Continuing with the description of FIG. 8, HOM fiber 80 is formed to include an expanding taper region 92, which expands in an adiabatic manner so as to preserve the mode profile of the fundamental mode signal propagating within core region 82.

In some prior art configurations, residual amounts of HOM light may still be propagating as "stray light" within cladding layer 84 at the output area of HOM fiber 80. In accordance with an exemplary embodiment of the present invention, this HOM stray light can be removed by placing all-glass cladding mode stripper 10 along taper waist 90, as shown in FIG. 8. Advantageously, outer coating layer 16 is removed prior to initiating the tapering process, allowing for cladding layer 14 to be exposed such that beads 12 may be directly fused to layer 14. In this embodiment, the plurality of beads 12 refract the HOM light (such as $LP_{11}$ mode) that has entered tapered cladding layer $84_T$ as a result of the tapering process.

The inclusion of all-glass cladding mode stripper 10 of the present invention thus ensures that most, if it all, of the higher-order modes have been removed from the output signal exiting HOM fiber 80.

Figure 9:
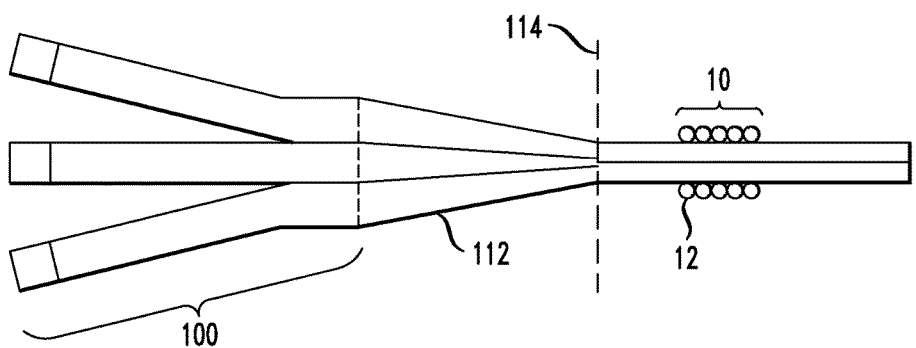
FIG. 9 depicts the utilization of the cladding mode stripper of an exemplary embodiment of the present invention with a tapered fiber bundle.

FIG. 9 illustrates another application for the all-glass cladding mode stripper of the present invention. In this case, a tapered fiber bundle 100 is fused to a single output fiber 110. As is known in the art of creating tapered fiber bundle configurations, a plurality of separate fibers are grouped together, with outer coatings removed, and the collected group tapered along a length shown as taper 112 in FIG. 9. In some cases, selected portions of the cladding layers of each fiber are also stripped away so that the core regions tend to join together.

It is known that at a splice location 114 between tapered fiber bundle 100 and output fiber 110, stray light will be propagating along cladding layer 120 of output fiber 110. Thus, in accordance with an exemplary embodiment of the present invention, all-glass cladding mode stripper 10 may be disposed along a region of output fiber 110, with a plurality of beads 12 coupled to cladding layer 116 of output fiber 110. In the same manner as the above-described embodiments, beads 12 will refract the stray light out of cladding layer 116 and away from output fiber 110.

Figure 10:
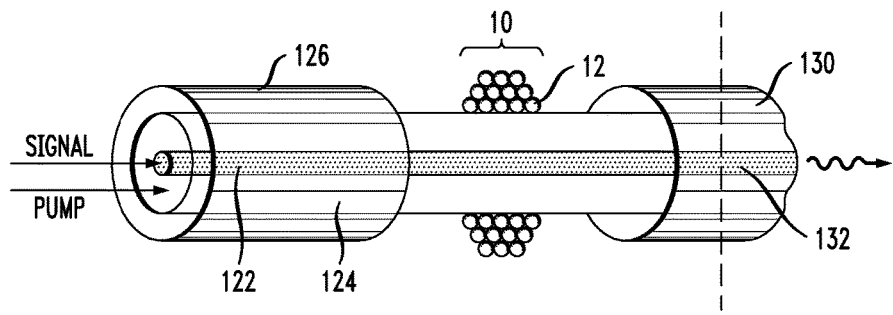
FIG. 10 depicts the utilization of the cladding mode stripper of an exemplary embodiment of the present invention to remove stray signal light from a fiber-based optical amplifier.

The above discussion mentions that one exemplary utilization of an all-glass cladding mode stripper of the present invention is in the context of a fiber-based optical amplifier or laser. FIG. 10 illustrates a section of optical gain fiber 120 as used in these applications. Here, a core region 122 is doped with a rare-earth material (such as erbium) that amplifies an incoming optical signal in the presence of pump light. An input signal I to be amplified is shown as being coupled into core region 122. Pump light P is shown as being coupled into a cladding layer 124 surrounding core region 122, with an outer coating layer 126 formed to cover cladding layer 124.

An exemplary all-glass cladding mode stripper 10 formed in accordance with an exemplary embodiment of the present invention is shown as positioned at an output end of the amplifier structure. As with the various configurations discussed above, a portion of outer coating layer 126 is removed so that mode stripper 10 is positioned adjacent to cladding layer 124. The plurality of beads 12 of mode stripper 10 function to refract both any residual pump light that may be present (that is, any pump light not absorbed during the amplification process) as well as stray, amplified signal light that is propagating within cladding layer 124. In this particular configuration shown in FIG. 10, multiple layers of beads 12 are shown as surrounding exposed lading layer 124.

A section of output fiber 130 is shown as spliced to an end termination of amplifier fiber 120. In accordance with an exemplary embodiment of the present invention, the utilization of all-glass cladding mode stripper 10 ensures that only the amplified signal light exiting core region 122 of amplifier fiber 120 will be coupled into core region 132 of output fiber 130.

Figure 11:
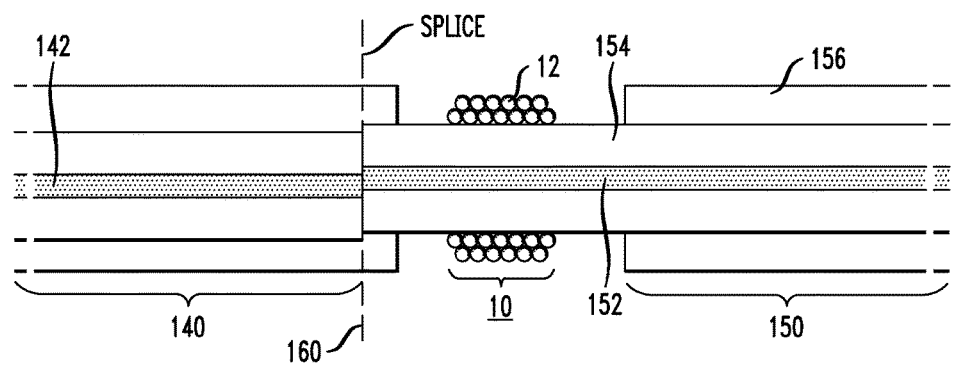
FIG. 11 depicts the utilization of the cladding mode stripped of an exemplary embodiment of the present invention to remove stray light in the region of a fusion splice between two optical fibers.

Another utilization of an exemplary embodiment of the invention all-glass cladding mode stripper with a fiber splice location is shown in FIG. 11. In this application, two fibers 140, 150 of similar form are being spliced together. However, core regions 142 and 152, respectively, become slightly mis-aligned during the splicing operation at splice location 160 (the mis-alignment exaggerated for the sake of discussion). As a result of the mis-alignment, a portion of the signal propagating along core region 142 will be injected into cladding layer 154 of optical fiber 150. Thus, in accordance with an exemplary embodiment of the present invention, cladding mode stripper 10 is disposed along an exposed section of cladding layer 154 (i.e., outer coating 156 removed in this section), allowing for the stray light within cladding layer 154 to be directed outward and away from core region 152 of optical fiber 150. As in all of the other above-described configurations, the removal of stray light propagating along the cladding layer minimizes the possibility of thermal damage to the fiber.

Figure 12:
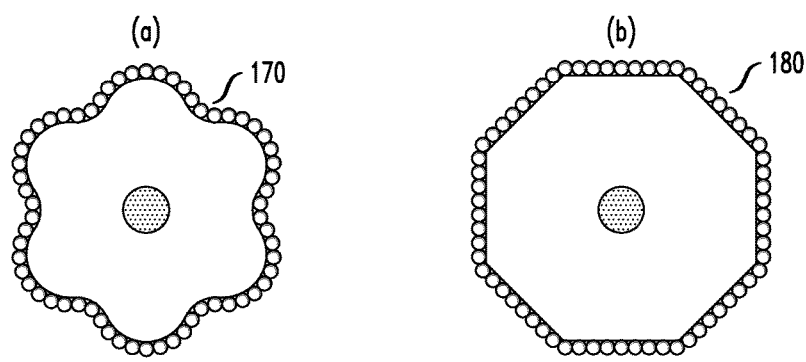
FIG. 12 is a cross-sectional view of two exemplary configurations of a mode stripper in accordance with exemplary embodiments of the present invention, illustrating the use of the mode stripper with fibers of non-circular geometry.

While the embodiments described thus far illustrate the utilization of the inventive all-glass mode stripper with fibers of conventional, circular cross section, it is to be understood that the all-glass mode stripper may be used with fibers of various geometries, as long as glass beads 12 are able to be disposed adjacent to the cladding layer (e.g., directly fused to the cladding layer material or contained in a suspension that is adhered to the cladding layer material). FIG. 12 (a) illustrates one exemplary non-circular cross section geometry 170 and FIG. 12(b) illustrates another exemplary non-circular cross section geometry 180. Any other suitable geometry is possible.

It is evident from the above that an exemplary embodiment of the all-glass, bead-based cladding mode stripper of the present invention is useful with any type of fiber, in any situation where there is a need to strip away stray light propagating in a cladding layer. Thus, while several specific embodiments have been described, it is to be understood that these embodiments are exemplary only and the scope of the present invention is intended to be limited only by claims as appended hereto.

What is claimed is:

1. A method of fabricating an all-glass cladding mode stripper for an optical fiber, comprising:

providing an optical fiber having a core region surrounded by a cladding layer, with one or more outer layers disposed to surround the cladding layer;

providing a plurality of glass beads formed of a material having a refractive index greater than the refractive index of the cladding layer, with each glass bead having a diameter less than 100 µm;

exposing a section of the cladding layer, the length of the exposed section defining an interaction length of the cladding mode stripper; and fusing the plurality of provided glass beads directly to a surface area of around the exposed section of the cladding layer.

2. The method as defined in claim 1 wherein the step of providing a plurality of glass beads further comprises selecting glass beads of a material with a melting point less than that of the material forming the provided optical fiber, and the fusing step comprises heating the plurality of provided glass beads and the optical fiber to the melting point of the plurality of provided glass beads, so as to fuse the plurality of provided glass beads to an outer surface of the cladding layer while maintaining the integrity of the cladding layer.

3. The method as defined in claim 2 wherein the heating step uses a source selected from a group consisting of: an $H_2/O_2$ torch, RF heater, a $CO_2$ laser, and a resistive filament.

* * * * *